Sept. 15, 1942. G. M. KRIEGBAUM ET AL 2,296,210
PLANTER MARKER
Filed June 21, 1941 2 Sheets-Sheet 2
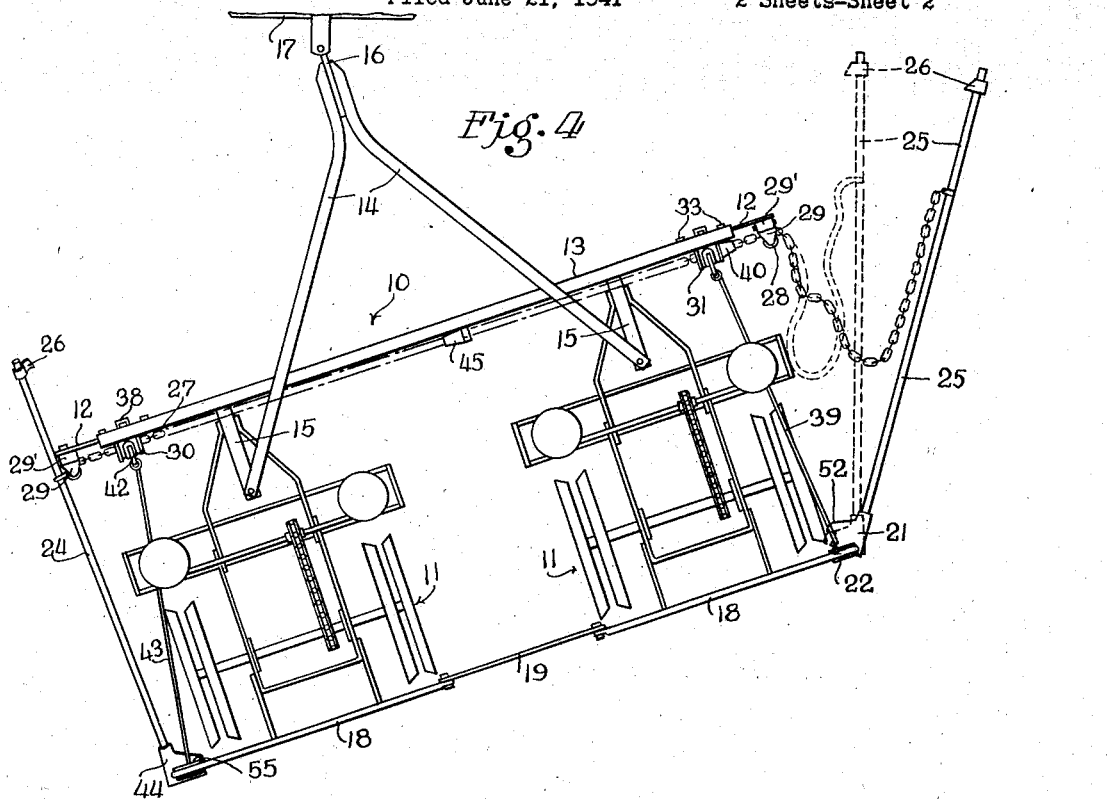
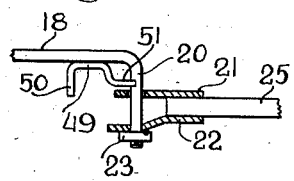
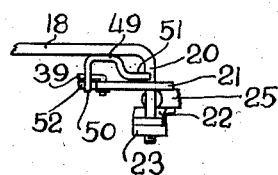
Inventor
George M. Kriegbaum
Clarence C. Haas
By Paul O. Pippel
Atty Patented Sept. 15, 1942

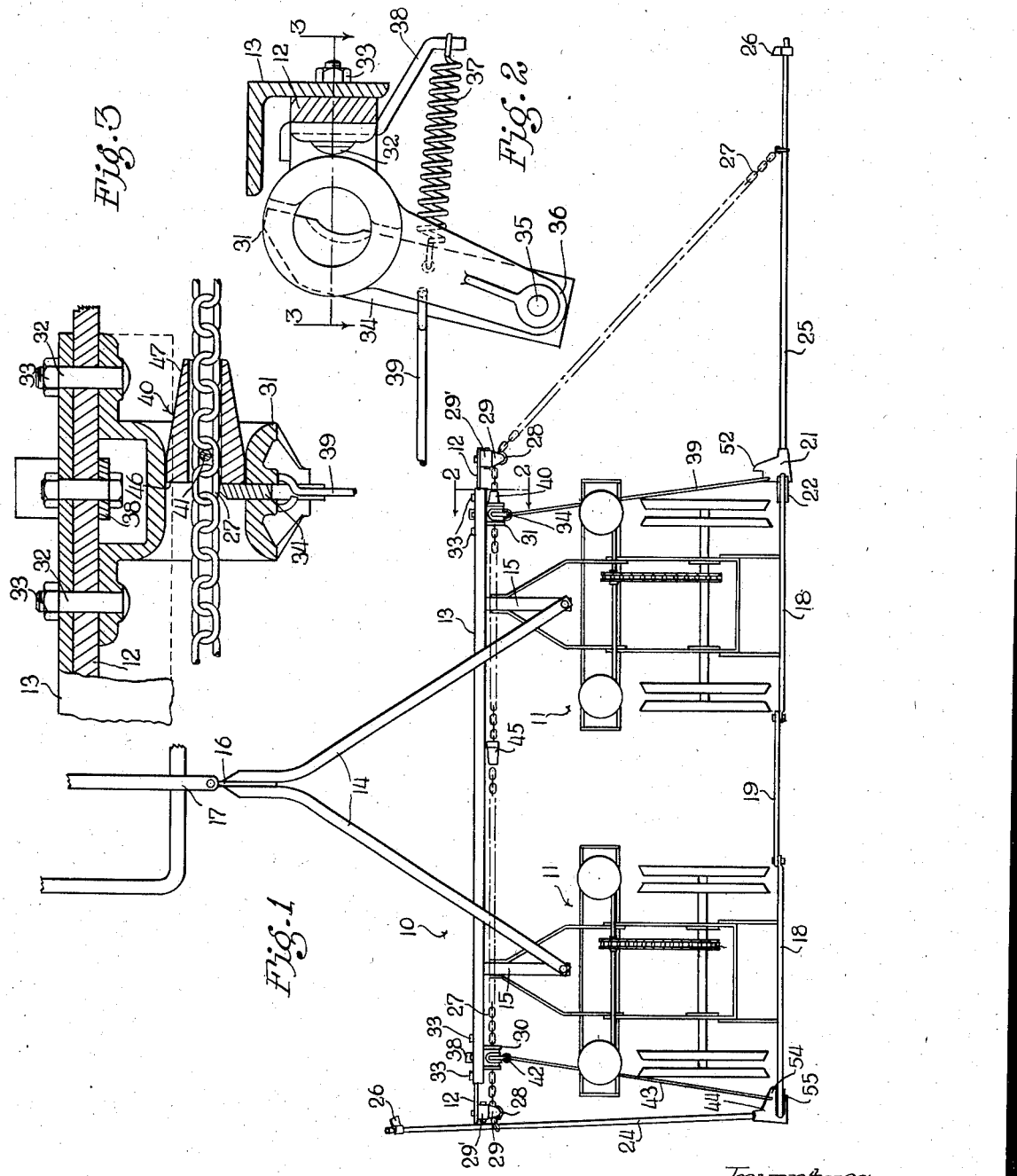

2,296,210

UNITED STATES PATENT OFFICE 2,296,210

PLANTER MARKER

George M. Kriegbaum and Clarence C. Haas, Richmond, Ind., assignors to International Harvester Company, a corporation of New Jersey Application June 21, 1941, Serial No. 399,132

9 Claims. (Cl. 97—230)

This invention relates to an implement marker. More specifically it relates to a marker construction which involves a pair of markers connected at opposite sides of a planter.

A marker construction is well known which involves a pair of marker arms pivotally connected at opposite sides of a planter and connected with one another by means of a flexible element so that the holding of one marker element in operative position insures the holding of the other marker arm in inoperative position. The marker in operative position is held in this position by the drag of the ground upon the end of the marker as the planter moves in a straight line over the ground. When a turn is made, the end of the marker in operative position moves forward with respect to the planter toward inoperative position, and the other marker moves toward operative position. The last mentioned marker arm is moved considerably toward operative position before the turn of the planter is substantially completed. Consequently, as the turn is made near a fence or other obstruction, the marker arm, going into operative position, may strike the obstruction unless the planter is turned a sufficient distance away from it. The present invention relates to an arrangement for preventing the movement of the one marker arm from inoperative position toward operative position until the turning of the planter has been substantially completed or at least has been carried out to a considerable extent.

An object of the present invention is to provide an improved marker construction.

A further object is the provision of an improved marker construction for a planter.

Another object is to provide an improved arrangement for the control of marker arms connected at opposite sides of an implement.

Still another object is the provision of a marker construction by which the release of a marker arm from inoperative position is delayed until a turn of the planter has been substantially completed.

A still further object is the provision of means for limiting movement of the marker arms beyond the inoperative position.

According to the present invention, the planter is provided with pivotally mounted markers at opposite sides thereof interconnected by means of a flexible element so that when one marker is in operative position, the other is in inoperative position. Means are also provided for holding one marker in inoperative position even after the other marker has moved somewhat out of inoperative position, and these means are released upon a predetermined movement of the said other marker away from operative position. The marker arms are also provided with stops at their pivoted ends, which prevent movement of the arms beyond the inoperative position.

In the drawings:

Figure 1 is a plan view of a planter showing the novel marker construction;

Figure 2 is a detailed sectional view taken along the lines 2—2 of Figure 1;

Figure 3 is a sectional view taken along the line 3—3 of Figure 2;

Figure 4 is a plan view showing the planter during turning; and,

Figures 5 and 6 are detailed views showing the mounting of the marker arms upon the planter.

Reference character 10 designates a planter composed of planting units 11 connected to one another by means of a cross-bar 12 and an angle member 13. Hitch members 14 are secured to the angle member 13 and to parts 15 on each planter unit 11 and embrace at their forward end an element 16 pivotally connected to a draw-bar 17 of a tractor, not shown. There are cross pieces 18 at the rear of the planting units 11 connected to one another by a member 19, as shown in Figures 5 and 6. Each cross piece 18 has a downwardly bent end portion 20 upon which is pivotally mounted a marker arm by means of a plate 21 and a strap 22 resting against a shoulder member 23 secured to the bent end 20 and retaining the marker arm upon the bent end, as viewed in Figure 1. The marker arm at the left of the planter is designated by the reference numeral 24, and the marker arm at the right of the planter, by the reference numeral 25. Each marker arm has a marker element 26 at the outer end thereof. The marker arms are interconnected by means of a flexible element 27 in the form of a chain, which passes over rollers 28 mounted in U-shaped members 29, secured to members 29', secured in turn to the ends of the cross-bar 12. The chain 27 also passes through guides 30 and 31 which are secured adjacent the ends of the angle member 13 by bolts and nuts 32 and 33, as shown in Figure 3. As shown also in Figure 3, the guide 31 is slotted to receive a stop 34 pivotally connected at 35 to an extension 36 of the guide 31. A spring 37, connecting a part 38 depending from the parts 12 and 13, holds the stop 34 within the guide 31, as shown in Figure 2. A link 39 connects the stop 34 and the plate 21 forming part of the pivotal support of the marker arm 25 on the bent end 20 of the cross pieces 18. A member 40 is secured to the chain 27 by means of a pin 41 extending through a link of the chain and abuts the stop 34 in the manner shown in Figure 3. At the opposite side of the planter the stop 35 is slotted to receive a stop 42 pivotally connected to the guide in the same manner as the stop 34 is connected to the guide 31. A link 43 connects the stop 42 and a plate 44, forming part of the pivotal support of the marker arm 24 upon the one planter unit in the same way that the plate 21 forms a support for the arm 25. A second member 45, similar to the member 40, is secured to the chain 27 in spaced relation to the member 40.

Figure 1 shows the planter in normal planting position. The planter is pulled over the ground by means of the tractor acting through the drawbar 17, and the marker arm 25 extends outwardly from the right side of the planter with the marker element 26 contacting the ground. The other marker arm 24 extends alongside the planter with its marker element 26 lifted out of engagement with the ground. The drag of the ground upon the marker element of the marker arm 25 holds the marker arm 25 in the position shown, and the arm 25 in turn, acting through the flexible element 27, holds the arm 24 in inoperative position, as shown. The arm 24 is also held in inoperative position by means of the member 40 secured to the flexible element 27 and the stop 34 which engages an end surface 46 perpendicular to the flexible element. The opposite end of the member 40 is relatively small, and the surface extending therefrom is frusto-conical, as indicated at 47.

As shown in Figure 4, when a turn of the planter to the right is made, the marker arm 25 moves forwardly with respect to the planter, as shown in the full line position of the arm 25 in Figure 4. Since the member 40 is engaged by the stop 34, there is no movement of the marker arm 24 away from inoperative position even though slack in the portion of the chain 27 between the member 40 and the marker arm 25 is present. When the marker arm 25 has moved to the dotted line position of Figure 4, the connection of the plate 21 with the link 39 is rotated sufficiently, so that a pull lengthwise of the link 39 takes place, and the stop 34 is moved out of engagement with the member 40. With the release of the member 40 by the stop 34, the marker arm 24 moves to operative position. However, the turn of the planter will have been completed to a substantial degree by the time the marker arm 25 reaches the dotted line position of Figure 4, and consequently, the marker arm 24 does not begin to move away from inoperative position until this time, and so it will not be engaged by any obstruction such as a fence alongside the planter during its turning. In the planting of the next row, the planter moves in the opposite direction from that of the previous row, and the marker arm 24 is extended, the marker arm 25 being alongside the planter in inoperative position. The member 45, secured to the flexible element 27, will have moved through the guide 30, past a stop 42, taking a position just outside the stop. At the end of the row in which a marker arm 24 has served to mark the ground, the tractor and planter will be turned to the left. This also results in the moving forward out of operative position of the marker arm 24 in the same manner as the marker arm 25 moves away from operative position, as shown in Figure 4. When the turn has been sufficiently completed, the marker arm 24 will have moved out of operative position to the same relative position as the dotted line position of the marker arm 25 in Figure 4, and the plate 44 will have exerted a sufficient longitudinal pull upon the link 43 to swing the stop 42 out of the guide 30 sufficiently to allow the passage of the member 45, secured to the chain 27, through the guide 30. The marker arms are then returned to the position in Figure 1.

It has been stated that the holding of one marker arm in operative position insures the holding of the other marker arm in inoperative position. It may also be stated that the position of the one marker arm in inoperative position limits the position taken by the other marker arm in operative position. For example, the marker arm 24 engages one end of the cross-bar 12 so as to be prevented from further clockwise movement, and thus the movement of the marker arm 25 in a clockwise direction is limited, and the operative position of the arm 25 is determined.

As seen in Figures 5 and 6, there is an element 49 secured to the underside of the cross piece 18 adjacent the downwardly bent end portion 20. The element 49 has a downwardly extending portion 50 and another portion 51 spaced from the cross piece 18 and contacting the downwardly bent end portion 20. The plate 21 has a projection or shoulder 52, as shown in Figures 1 and 6, which in the inoperative position of the marker arm 25 engages or strikes against the downwardly extending portion of the element 46. Thus, the marker arm 25 may not move in a counter-clockwise direction beyond the inoperative position in which the shoulder 52 strikes the downwardly extending portion 50. Thus, the movement of the marker arm 25 into inoperative position is limited. When the marker arm 25 is in inoperative position, it is raised slightly so that the marker element 26 is out of contact with the ground, and the marker arm abuts the end of the cross-bar 12. However, in the movement from operative position to inoperative position, the marker arm is not raised until the very last moment, and without the cooperation between the downwardly extending portion 50 and the shoulder 52, the marker arm might swing in a clockwise direction beyond inoperative position to a position beneath the planter and thereby become damaged. However, the downwardly extending portion 50 and the shoulder 52 act as stop means for preventing movement of the arm 25 beyond inoperative position. The portion 51 of the element 49, which contacts the downward extension 20 of a cross piece 18, limits upward movement of the marker arm 25 along the downward extension 20 by serving as a stop for the plate 21.

Similarly, the movement of the marker arm 24 in a clockwise direction beyond the inoperative position of Figure 1 is limited by the engagement of the shoulder or projection 54 of the plate 44 with the downwardly extending portion, not shown, of an element 55 secured to the underside of the other cross piece 18.

It will be apparent from the foregoing description that a new and novel construction has been provided, by which the movement of a pair of markers connected to an implement such as a planter is controlled. By means of the novel arrangement the one marker does not move out of inoperative position until the other marker has moved a predetermined amount away from operative position. Thus, the one marker is not released from inoperative position until the turning of the planter has been substantially completed or at least has been carried out to a considerable extent, and the marker runs no danger of striking an obstruction on the side of the planter away from which turning takes place.

The intention is to limit the invention only within the scope of the appended claims.

What is claimed is:

1. In combination, an implement, a pair of marker arms connected at opposite sides of the implement for movement between an operative position and an inoperative position, means interconnecting the marker arms to cause the holding of one marker arm in operative position to insure the holding of the other arm in inoperative position, means engageable with the interconnecting means to lock one marker arm in inoperative position, and means associated with the other marker arm and the engageable means for releasing the engageable means from the interconnecting means upon a predetermined movement of the said other marker arm away from operative position for releasing the said one marker arm from inoperative position.

2. In combination, an implement, a pair of marker arms connected at opposite sides of the implement for movement between an operative position and an inoperative position, a flexible element interconnecting the marker arms and extending across the implement to cause the holding of one marker arm in operative position to insure the holding of the other arm in inoperative position, means engageable with the flexible element to prevent movement of the flexible element across the planter and thereby movement of one marker arm away from inoperative position, and means connecting the other marker arm and the engageable means for releasing the engageable means from the flexible element upon a predetermined movement of the said other marker arm away from operative position to release the said one marker arm from inoperative position.

3. In combination, an implement, a pair of marker arms connected at opposite sides of the implement for movement between an operative position and an inoperative position, means interconnecting the marker arms to cause the holding of one marker arm in operative position to insure the holding of the other marker arm in inoperative position, a first holding means engageable with the interconnecting means to prevent movement of one marker away from inoperative position, means associated with the other marker arm and the first holding means for releasing the holding means from the interconnecting means upon a predetermined movement of the marker arm away from operative position, a second holding means engageable with the interconnecting means to prevent movement of the said other marker arm away from inoperative position, and means associated with the said one marker arm and the second holding means for releasing the second holding means upon a predetermined movement of the said one marker arm away from operative position.

4. In combination, an implement, a pair of marker arms connected at opposite sides of the implement for movement between an operative position and an inoperative position, a flexible element interconnecting the marker arms and extending across the implement to cause the holding of one marker arm in operative position to insure the holding of the other arm in inoperative position, a pair of guides mounted at opposite sides of the planter and slidably supporting the flexible elements, movable stop members associated with the guides for engaging the flexible element to prevent the marker arms from moving away from inoperative position, and means connecting each marker arm with the movable stop member associated with the guide on the same side of the planter as the particular marker arm for moving the stop member out of engagement with the flexible element to permit movement of the other marker arm out of inoperative position upon a predetermined movement of the particular marker arm away from operative position.

5. In combination, an implement, a pair of marker arms connected at opposite sides of the implement for movement between an operative position and an inoperative position, a flexible element interconnecting the marker arms and extending across the implement to cause the holding of one marker arm in inoperative position to insure the holding of the other arm in operative position, a pair of guides mounted at opposite sides of the planter and slidably supporting the flexible element, movable stops associated with the guides, a pair of members secured to the flexible element at spaced points, each being so shaped as to be allowed to move past the stop on one side in a direction away from the other side and to be prevented by engagement with the stop from moving past it in the direction toward the other side for holding the marker arm on the said other side in inoperative position, the marker arm on the said other side being held in inoperative position, and means connecting each stop with the marker arm on the same side of the implement for releasing the stop upon predetermined movement of the marker arm on the same side away from operative position to release the marker arm on the other side from inoperative position.

6. In combination, a planter, a pair of marker arms connected to the planter at opposite sides for movement between an operative position and an inoperative position, a flexible element interconnecting the marker arms to cause the holding of one marker arm in operative position to insure the holding of the other marker arm in inoperative position, guides mounted at opposite sides of the planter and slidably supporting the flexible element, stops slidably mounted in the guides, members secured to the flexible element at spaced points, each member having at one end a sloping surface for causing the member to move past the stop on one side in the direction away from the other side, each member having at the other end a non-sloping surface for preventing the member from moving past the stop in a direction toward the other side so as to hold the marker arm at the other side in inoperative position, and means connecting each stop and the marker arm on the same side for releasing the stop upon predetermined movement of the marker arm on the same side away from operative position to release the marker arm on the opposite side from inoperative position.

7. In combination, a planter, draft means connected to the planter for pulling the planter in a straight line over the ground for planting in rows and for turning the planter, marker arms pivotally connected to the planter at opposite sides for movement from an operative position extending outwardly from the side of the planter to an inoperative position extending alongside the planter, a flexible element interconnecting the marker arms for causing the holding of one marker arm in operative position by drag of the ground upon the end of the arm during movement of the planter over the ground in a straight line to insure holding of the other marker arm in inoperative position, a first holding means mounted on the planter and engaging the flexible element so as to prevent movement of the flexible element in one direction for holding one marker in inoperative position, means associated with the first holding means and the other marker arm for releasing the first holding means to permit movement of the flexible element in the said one direction and release of the said one marker arm from inoperative position upon a predetermined movement of the said other marker arm away from operative position due to turning of the planter toward the side at which the said other marker arm is connected, a second holding means mounted on the planter and engaging the flexible element so as to prevent movement of the flexible element in the direction opposite that in which the first holding means prevents movement for holding the said other marker arm in inoperative position, and means associated with the second holding means and the said one marker arm for releasing the second holding means to permit movement of the flexible element in the said opposite direction and release of the said other marker arm from inoperative position upon a predetermined movement of the said one marker arm away from operative position due to turning of the planter toward the side at which the said one marker is connected.

8. In combination, an implement including a frame member having a downward extension at one end, a marker arm, spaced parts secured to opposite sides of one end of the marker arm and journaled on the downward extension of the frame member to form a pivotal support for the marker in movement from an operative position to an inoperative position, the one part having a shoulder, an element secured beneath the frame member adjacent the downward extension and having a downwardly extending portion engageable with the shoulder of the said one part for preventing movement of the marker arm beyond inoperative position, said element having another portion spaced below the frame member and contacting the downward extension thereof so as to limit the upward movement of the said one part and thereby the upward movement of the marker arm along the downward extension.

9. In combination, an implement, a pair of marker arms connected at opposite sides of the implement for movement between an operative position and in inoperative position, means interconnecting the marker arms to cause the holding of one marker arm in operative position to insure the holding of the other arm in inoperative position, means engageable with the interconnecting means to prevent movement of one marker arm away from inoperative position, means associated with the other marker arm and the engageable means for releasing the engageable means from the interconnecting means upon a predetermined movement of the said other marker arm away from operative position for releasing the said one marker arm from inoperative position, and stop elements secured to the marker arms adjacent their connections with the implement, and stop elements secured to the implement and adapted to be engaged by the stop elements on the marker arms for preventing movement of the marker arms beyond inoperative position.

GEORGE M. KRIEGBAUM.
CLARENCE C. HAAS.